Sept. 3, 1940.  G. W. HEISE ET AL  2,213,429
PRIMARY GALVANIC CELL
Filed Feb. 27, 1937  2 Sheets-Sheet 2

INVENTORS
GEORGE W. HEISE
ERWIN A. SCHUMACHER

BY  *Ed Freenewald*
ATTORNEY

Patented Sept. 3, 1940

2,213,429

UNITED STATES PATENT OFFICE 2,213,429

PRIMARY GALVANIC CELL

George W. Heise, Rocky River, and Erwin A. Schumacher, Lakewood, Ohio, assignors to National Carbon Company, Inc., a corporation of New York Application February 27, 1937, Serial No. 128,126

13 Claims. (Cl. 136—136)

This invention relates to primary electric cells and more particularly to air-depolarized cells in which the cathode is depolarized by the aid of oxygen rendered available for this purpose by carbon so disposed as to transfer oxygen from the air outside the cell to surfaces within the cell where it effects depolarization.

Cells of this type are frequently of the deferred action type, in which solid electrolyte material is provided within the cell and activation is accomplished by adding water. A caustic electrolyte of about 20 per cent concentration may be used, and the solid electrolyte-forming material may approximate a monohydrate of sodium hydroxide. The latter material may be cast around the electrodes where it serves the purpose of protecting the electrodes prior to activation. A material such as lime or bentonite may be added to prolong the useful life of the cell in known manner, such material being mixed with the electrolyte-forming material or otherwise so disposed within the cell container that it is in contact with the electrolyte during the useful life of the cell. The anode is generally of zinc. Cells of this type are well known in the art and are described for example in United States Patent 1,972,775 issued to George W. Heise, and in United States Patent 2,051,987 issued to Dario Domizi.

In the cells of the kind described above, as disclosed in the patents above mentioned and as well known in commerce, the cathode member has consisted of a block of bonded or agglomerated carbonaceous particles. This block has been self-supporting and the aggregate thus formed has been porous in structure. The carbon has sometimes been water-proofed by treating with a solution of rubber in benzene with or without the addition of a mineral oil, as described in our United States Patent 2,017,280.

The bonded or agglomerated cathode construction used at present in the air depolarized type of primary cell has many advantages, but it is not the only possible construction. We have found that it is possible, and sometimes advantageous, to form the cathode member from unbonded or unagglomerated, or partially agglomerated, particles of carbonaceous material such as a carbon black.

Such an unbonded or partially bonded aggregate is not strongly self-supporting and must therefore be supported in such a manner that the electrolyte has access to the depolarizer. The depolarizer must have at least one surface exposed to the atmosphere or be otherwise placed in communication therewith, and an adequate electrically conducting path between the depolarizer and the external cell connections must be assured. Although a supporting means permeable to the electrolyte is necessary, if the openings therein are too large they may permit fine depolarizing material to sift into the electrolyte. Accordingly, among the objects of this invention are: to provide an improved cathode comprising an unbonded and unagglomerated, or partially bonded and agglomerated, aggregate of depolarizing material; to provide a suitable support for the depolarizing material; to provide for effective admission of air to the depolarizing material; to ensure electrical contact between the depolarizing material and its support; to provide a cathode formed of partially bonded depolarizing material surrounded by a suitable support, the material being bonded or agglomerated to an extent insufficient to impart enough mechanical strength to withstand ordinary handling in use.

These and other objects of our invention are attained as described in the following specification wherein reference is made to the accompanying drawings in which Fig. 1 is a vertical cross section of a primary cell embodying various features of our invention and showing an anode provided with an open central well;

Figure 1:
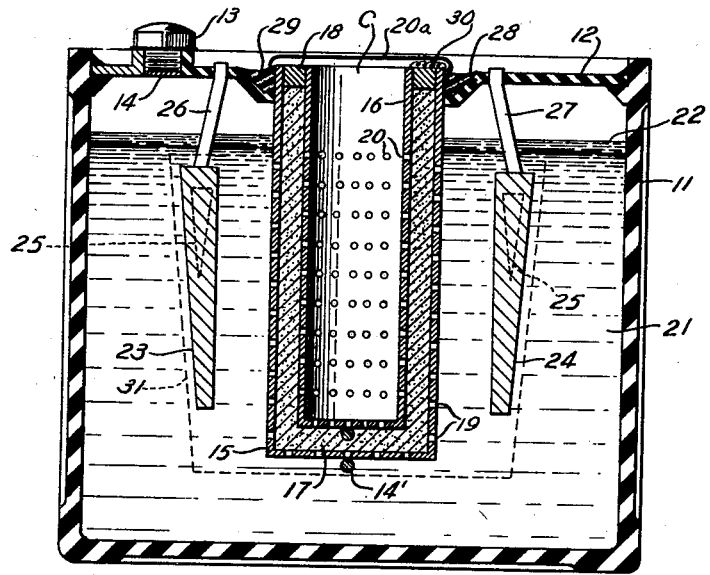

In the embodiment illustrated in Fig. 1 of the drawings we employ a suitable container 11 for the cell assembly. In many cases two or more cells would be secured in a common assembly to form a battery. The container 11 is provided with a cover 12 having an opening 13 therein to permit filling the container with water and/or electrolyte and to allow inspection of the battery during operation. On opening 13 which has a frangible diaphragm 14 as disclosed in Patent 2,051,987, issued to Dario Domizi, is advantageous. A cathode assembly C extends through an opening in the cover 12 and may be supported upon a transversely extending rod 14'. The cathode assembly C suitably comprises an outer container or basket 15 which may be of wire mesh, perforated metal, cloth or other electrolyte permeable material and an inner member 16 which may be made of the same or similar material. Between members 15 and 16 is packed comminuted carbonaceous material 17 such as is disclosed in the United States Patent 2,010,608 issued to Schumacher, Hamister, and Heise, or in the United States Patent 2,017,280 issued to Heise and Schumacher. Although not essential, it is desirable that the top of the opening between the outer container or basket 15 and the inner member 16 be closed by a suitable plug or seal 18 to protect and hold in place the carbonaceous material 17 at the top of the cell. If the container 15 and inner member 16 are made of sheet material they are provided with suitable apertures 19 and 20. Surrounding the cathode assembly C is an electrolyte 21 which may be covered by a thin layer of oil 22 which serves to prevent evaporation of the water from the electrolyte and also prevents contamination of the electrolyte, as by the carbon dioxide of the air. The apertures 19 in the container 15 are preferably all below the oil layer. Anodes 23 and 24 may be supported, spaced from the cathode assembly C, by projections 25 therein which are adapted to engage corresponding indentations in the walls of the cell container 11. The anodes may be provided with suitable lead wires 26 and 27 which are covered with insulating material where they pass through the electrolyte. Although the construction of the anodes should be evident from Fig. 1 of the accompanying drawings, for a more detailed description reference is made to Figs. 5 and 6 of the Domizi patent above referred to. The cover 12 has a depending portion 28 engaging the outer container 15 of the cathode assembly C and the recess thereby formed may be filled with suitable thermoplastic sealing material 29. The inner member 16 is open to the atmosphere at its upper end to permit access of the air to the depolarizing material 17 through the perforations 20. During shipment, this opening may be closed by a piece of suitable sealing material 20a which is subsequently removed before the battery is placed in service. It is frequently convenient to secure said piece of sealing material to the thermoplastic sealing material 29. The outer container 15 and the inner member 16 are preferably, but not necessarily, electrically connected, for instance by a copper wire 30 at the top of the assembly C.

When the cell is assembled for shipment, before use, the outer perforated jacket member 15 and the anodes 23 and 24 may be surrounded by a cast 31 of caustic alkali electrolyte-forming material such as that disclosed in United States Patent 1,924,314 to George W. Heise. The outline of this cast 31 of electrolyte-forming material is shown in dotted lines. During shipment the cast of solid material prevents loss of fine depolarizing material through the perforations of the member 15 and supports the zinc anodes 23 and 24. The cell may be made ready for use by the addition of water which dissolves the cast 31 to form the electrolyte 21. We prefer to use a composition approximating monohydrate of sodium hydroxide as the electrolyte-forming solid material.

Although the use of hydrated caustic is old in cells having solid block electrodes it offers particular advantages in connection with cells of the types herein disclosed. In addition to preventing loss of fine materials, it reduces initial electrolyte penetration, which is more serious with the hollow electrode construction, and reduces the temperature attained during solution, which might otherwise be high enough to melt the conductive plastic coating which will be hereinafter described.

During operation of the cell, the perforations 20 in the inner member 16 allow air to come in contact with the carbonaceous material 17, whereby the oxygen of the air is conveyed to the portion of the cathode where polarization takes place, and this oxygen serves to depolarize the cell. The carbonaceous material 17 also serves as a barrier to prevent the electrolyte 21 from entering the ventilating well within the inner member 16.

Figure 2:
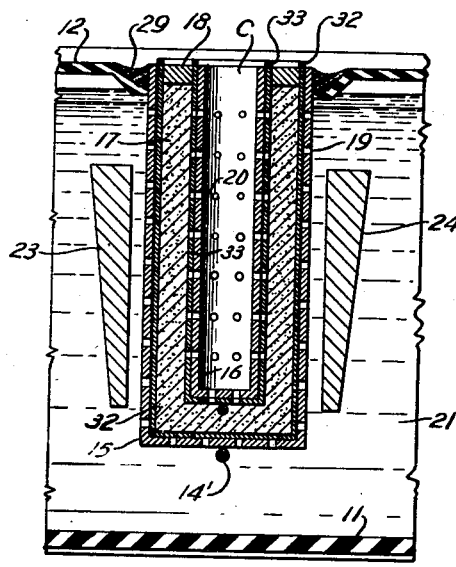
Fig. 2 is a similar view of a cell illustrating a modification in which the support for the cathode is provided with means for preventing loss of cathode material out of the support.

In the embodiment of the invention shown in Fig. 2 of the drawings, the action and construction is in most respects similar to that shown in Fig. 1 and described in connection therewith. However, we may provide a sleeve 32 of paper or the like, either on the inside of the container 15, as shown, or on the outside of the container 15. This paper may be coated with a starch paste to reduce the penetration of electrolyte into the carbonaceous material 17 within the cathode. The use of such a sleeve of paper or equivalent material also prevents the fine material within the cathode from sifting into the electrolyte. In case this sleeve is not a good conductor of electricity, and is on the inside of the container 15, the inner member 16 serves as the main path of the current from the cathode.

In order to maintain a good electrical contact between the carbonaceous material 17 and the inner member 16 a layer 33 of conducting material may be applied to the inner member 16. This material would preferably be applied as a plastic and would be hardened in a suitable manner before the carbonaceous material 17 is placed in the cathode assembly. The apertures 20 in the inner member 16 would be continued through the layer 33. If such a layer is placed on the inside wall of the basket or container 15, it performs the useful function of inhibiting creepage of electrolyte along that inside wall. Merely by way of example, the following suitable composition for such a layer is given:

| | Parts |
|---|---|
| Asphalt | 200 |
| Graphite (passed through a 30 mesh screen) | 300 |
| Graphite (passed through a 100 mesh screen) | 50 |

The above ingredients are heated and thoroughly mixed. The mixture is then spread on the metal and subjected to pressure and heat to form a conductive and adherent coating.

Figure 3:
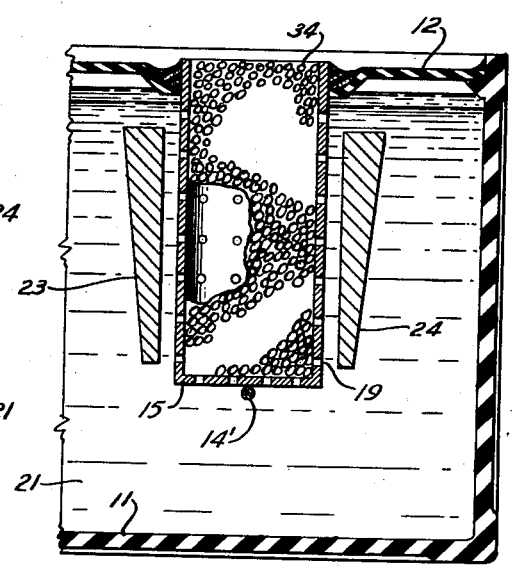
Fig. 3 is a similar view illustrating another modified form of our invention in which no central well is provided in the cathode.

In the embodiment illustrated in Fig. 3 there are included the casing 11, cover 12, electrolyte 21 and zinc anodes 23 and 24. In this modification, however, the cathode comprises a permeable container 15 such as sheet iron or other metal provided with perforations 19 containing partially bonded or agglomerated depolarizing material 34. There is no ventilating well within the cathode and the oxygen for depolarization is obtained through the top surface of the cathode. If desired in this or the various other modifications the carbonaceous material may be formed in aggregates of such a size that they will not readily sift through the openings 19.

Figure 4:
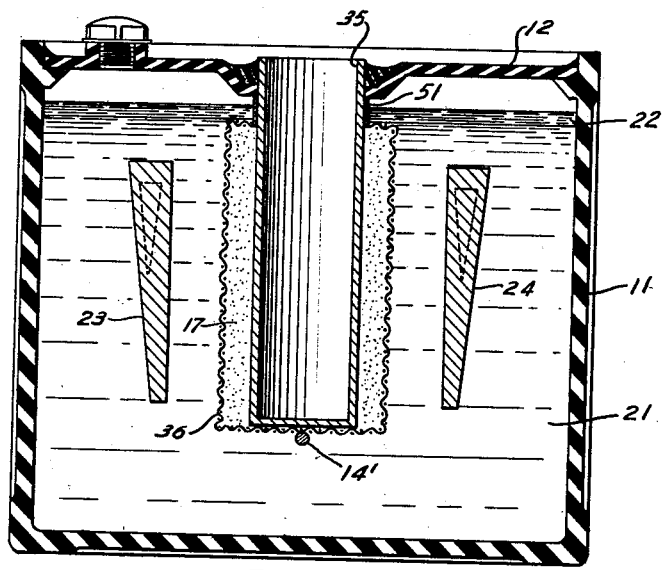
Fig. 4 is a vertical cross section of a cell illustrating a further modification of our invention in which the carbonaceous depolarizing material does not extend above the surface of the electrolyte.

In Fig. 4 we show a construction in which the body of carbonaceous depolarizing material is entirely submerged below the surface of the electrolyte. In this figure there are shown the container 11 provided with a cover 12, an electrolyte 21, anodes 23 and 24, and an oil layer 22. Through the cover 12 extends a cup or hollow member 35 corresponding to the member 16 of Figs. 1 and 2. This may be of perforated metal, as in the embodiments described above, but it may be of porous carbon. The bottom is preferably imperforate or sealed, especially when it extends substantially to the bottom of the mass of carbonaceous depolarizing material 17. This mass of depolarizing material is held in place by any suitable means which may be a perforated metal sheet but is preferably a wire fabric 36. The top of the carbonaceous material 17 is below the oil layer 22 at the surface of the electrolyte 21, and no means need be provided for keeping the oil from touching the depolarizing material 17. The portion of the carbon tube 35 above the mass of depolarizing material may be waterproofed as by wax impregnation or covered with a sealing material or provided with a sleeve 51 in order to prevent penetration of the oil or electrolyte into the interior of the tube.

Although we have referred to perforated metal as a preferred material for the outer container, we may use a porous material, e. g. carbon, instead. A porous carbon outer container would be especially advantageous with other than caustic electrolytes.

Figure 5:
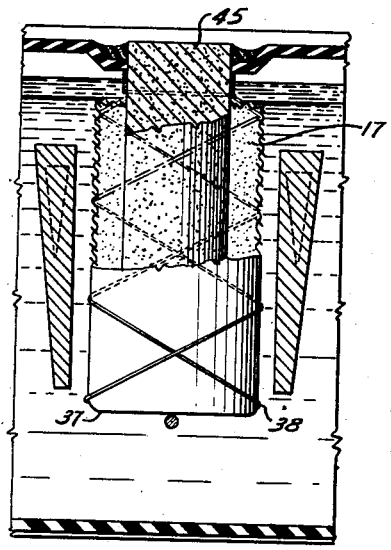
Fig. 5 is a similar view illustrating another embodiment of our invention in which a "bobbin" type cathode is employed.

In Fig. 5 we show an alternative form of construction in which we employ a "bobbin" type of cathode. This construction is similar to that shown in the other figures except for the details of the cathode. The cathode comprises a central member 45 which may be of perforated sheet metal or a hollow rod of porous carbon. In this construction, unbonded or unagglomerated depolarizing material 17 is packed around the outside portion of the lower end of the ventilating member and then bound with cloth 37 or with paper or equivalent electrolyte permeable material to hold the depolarizer in place. Normally, the bobbin is tied by a suitable wire or string 38 which serves to secure the whole cathode together. As in Fig. 4, the portion of the tube 45 above the depolarizing material 17 may be protected by a sealing material or sleeve.

The carbonaceous material may be placed in the container or basket 15 in any suitable manner, and it is preferably packed tightly therein because it then shows less tendency to sift out of the container, it has a higher conductivity, it is less susceptible to wetting by the electrolyte, and the cell has a higher operating voltage.

We have found that an especially suitable expedient for introducing the carbonaceous material into the container is to mix it with a volatile liquid which is preferably immiscible with the electrolyte. The moist mixture is then compacted in the container and the volatile liquid subsequently removed by heating. Although various liquids may be used for this purpose, we have found ethylene dichloride or carbon tetrachloride to be especially suitable. As an illustration of suitable proportions, a mixture of one gram of carbon black for each cubic centimeter of ethylene dichloride has been used successfully.

When the volatile liquid is used in compacting the material of the cathode in place, the waterproofing material previously mentioned may be applied to the carbonaceous material by solution or suspension in the liquid.

Although we have disclosed a number of embodiments of our improved cell, these are only by way of example, and numerous modifications will be obvious to those skilled in the art.

We claim:

1. A primary cell comprising a container having electrolyte and electrodes therein, one of said electrodes comprising an outer permeable supporting means, an air permeable inner member within said supporting means and spaced therefrom, an unbonded aggregate of particles of carbonaceous material within the space between said outer supporting means and said inner member and a layer of bibulous material between the outer supporting means and the carbonaceous material; said air permeable inner member acting to expose said aggregate to the atmosphere below the electrolyte level.

2. A primary cell as set forth in claim 1 in which the layer of bibulous material is paper.

3. A primary cell as set forth in claim 1 in which the layer of bibulous material is paper having a gelatinous coating.

4. A primary cell as set forth in claim 1 in which the layer of bibulous material is paper having a coating of starch.

5. A primary cell as set forth in claim 1 wherein said supporting means comprises a perforated metal basket.

6. A primary cell as set forth in claim 1 wherein said supporting means comprises a wire mesh fabric.

7. A primary cell comprising a container having a liquid electrolyte therein, electrodes supported within said container, one of said electrodes extending into said electrolyte and comprising an outer electrolyte permeable member, an inner air permeable member within said outer member and in spaced relation thereto, an unbonded aggregate of carbonaceous material substantially filling the space between said members, said air permeable member acting to maintain the carbonaceous material below the electrolyte level in communication with the atmosphere, and a layer of electrically conducting material insoluble in said electrolyte disposed between the carbonaceous material and at least one of said members and adhering to said member.

8. A primary cell as set forth in claim 7 in which the conductive material is on the outer wall of the inner member and there is a layer of bibulous material between the inner wall of the outer member and said carbonaceous material.

9. A primary battery cell comprising a casing, and a cover therefor, liquid electrolyte in said casing, electrodes supported in said electrolyte and a layer of liquid sealing material on the top of said electrolyte; one of said electrodes comprising an outer electrolyte permeable container disposed entirely below said liquid sealing material and an inner ventilating tube within said container and spaced therefrom and extending from a point below said sealing material through said cover, the portion extending through said cover being open to the atmosphere, an unbonded aggregate of granular depolarizing material substantially filling the space between said container and tube, a layer of bibulous material between the granular material and the container, and sealing means between said container and tube above said depolarizing material.

10. A primary cell comprising a casing, a liquid electrolyte within said casing, electrodes supported within said casing in contact with said electrolyte, one of said electrodes comprising an outer supporting means provided with apertures therein, said outer supporting means being filled with a partially bonded and compacted aggregate of fine particles of carbonaceous material, the particles of said carbonaceous material being of such a fine size that they cohere and will not pass through the apertures in said outer supporting means, said outer supporting means containing a layer of bibulous material between the outer supporting means and the carbonaceous material.

11. A primary cell of the deferred action type comprising a casing, an anode, a cathode, and a mass of hydrated caustic electrolyte-forming material surrounding the lower portion of said cathode; said cathode comprising a perforated container pervious to the electrolyte formed by the solution of said electrolyte forming material and an unagglomerated mass of fine particles of carbonaceous material compacted within said container, the particles of said carbonaceous mass being of a size to pass through the perforations in the container if said mass of electrolyte-forming material were not present.

12. A primary cell as set forth in claim 11 in which there is a conductive plastic coating on a surface in contact with the carbonaceous material.

13. A primary cell comprising a casing, liquid electrolyte in said casing and electrodes supported within said casing in contact with said electrolyte; one of said electrodes comprising an air permeable ventilating member having its upper end in contact with the atmosphere and a mass of unagglomerated and unbonded fine particles of carbonaceous depolarizing material compacted and bound about the lower end of said ventilating member, said depolarizing material being completely immersed in the electrolyte and being impermeable thereto but highly permeable to gas.

GEORGE W. HEISE.
ERWIN A. SCHUMACHER.